United States Patent
Park (10) Patent No.: US 9,411,484 B2
(45) Date of Patent: Aug. 9, 2016

(54) MOBILE DEVICE WITH MEMO FUNCTION AND METHOD FOR CONTROLLING THE DEVICE

(71) Applicant: Samsung Electronics Co. Ltd., Suwon-si, Gyeonggi-do (KR)

(72) Inventor: Jin Park, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 262 days.

(21) Appl. No.: 13/894,207

(22) Filed: May 14, 2013

(65) Prior Publication Data

US 2013/0311922 A1  Nov. 21, 2013

(30) Foreign Application Priority Data

May 15, 2012 (KR) .................. 10-2012-0051324

(51) Int. Cl.
   *G06F 3/048* (2013.01)
   *G06F 3/0481* (2013.01)
   *G06F 3/0488* (2013.01)
   *H04M 1/656* (2006.01)
   *H04M 1/67* (2006.01)

(52) U.S. Cl.
   CPC .......... *G06F 3/0481* (2013.01); *G06F 3/04883* (2013.01); *H04M 1/656* (2013.01); *H04M 1/67* (2013.01); *H04M 2250/22* (2013.01)

(58) Field of Classification Search
   CPC ... G06F 3/04883; G06F 3/0488; G06F 3/017; G06F 17/24; G06F 17/241; G06F 17/242
   See application file for complete search history.

(56) References Cited

U.S. PATENT DOCUMENTS

| | | | | |
|---|---|---|---|---|
| 4,868,765 | A * | 9/1989 | Diefendorff | 715/797 |
| 6,802,041 | B1 * | 10/2004 | Rehm | 715/201 |
| 2003/0043189 | A1 * | 3/2003 | Rieffel et al. | 345/753 |
| 2008/0174568 | A1 * | 7/2008 | Kim | G06F 3/04886 345/173 |
| 2009/0144656 | A1 * | 6/2009 | Kwon | G06F 3/0488 715/808 |
| 2009/0327871 | A1 * | 12/2009 | Wolf et al. | 715/243 |
| 2010/0315359 | A1 * | 12/2010 | Seong | G06F 15/025 345/173 |
| 2011/0006986 | A1 * | 1/2011 | Iemura | 345/160 |
| 2011/0179366 | A1 * | 7/2011 | Chae | 715/764 |
| 2011/0202999 | A1 * | 8/2011 | Logan | G06F 21/6227 726/26 |
| 2011/0263298 | A1 * | 10/2011 | Park | G06F 3/0482 455/566 |
| 2011/0304575 | A1 * | 12/2011 | Kim | G06F 3/04886 345/173 |
| 2012/0060089 | A1 * | 3/2012 | Heo | G06F 1/1647 715/702 |
| 2012/0064947 | A1 * | 3/2012 | Yi | G06F 3/0483 455/566 |
| 2013/0162667 | A1 * | 6/2013 | Eskolin et al. | 345/619 |
| 2013/0194301 | A1 * | 8/2013 | Robbins | G06F 21/60 345/629 |

OTHER PUBLICATIONS

Google, Android 2.2.0 User's Guide, May 20, 2010, Google, cover, p. 1, p. 321.*

* cited by examiner

*Primary Examiner* — Tadeese Hailu
(74) *Attorney, Agent, or Firm* — Jefferson IP Law, LLP (57) ABSTRACT

A mobile device with a memo function and a method for controlling the device are provided. The mobile device and method allows a user to input a short note to a privacy memo screen, on which the short note is not displayed during the input process, or to a screen in a locked state. The method includes executing a memo application in the background, and if a user's input for creating a memo is detected through a touch screen, creating a memo in the background through the memo application on the basis of the detected user's input.

18 Claims, 8 Drawing Sheets

MOBILE DEVICE WITH MEMO FUNCTION AND METHOD FOR CONTROLLING THE DEVICE

PRIORITY

This application claims the benefit under 35 U.S.C. §119(a) of a Korean patent application filed on May 15, 2012 in the Korean Intellectual Property Office and assigned Serial No. 10-2012-0051324, the entire disclosure of which is hereby incorporated by reference.

BACKGROUND OF THE INVENTION

1. Field of the Invention

The present invention relates to an apparatus and a method for using a memo screen. More particularly, the present invention relates to an apparatus and a method that allows a user to input a short note on to a privacy memo screen, on which the short note is not displayed during the input process, or to a screen in a locked state.

2. Description of the Related Art

Mobile devices are equipped with a variety of functions so that users can enjoy corresponding services. For example, users can store and manage information in mobile devices. That is, mobile devices allow users to write, store, and edit short notes. In order to enhance the security of short notes in mobile devices, passwords are applied to the short notes. However, applying passwords to short notes causes many problems, such as users forgetting or carelessly exposing their passwords. Presently, users cannot secretly write short notes in mobile devices. Therefore, a system is required that allows users to easily and secretly write short notes in the mobile devices.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method that allows a user to input a short note to a privacy memo screen, such that the short note is not displayed during the input process, so that the user can write it securely. The invention further provides a mobile device adapted to the method.

Another aspect of the present invention is to provide a method that allows a user to write a short note to a screen in a locked state or a screen in a power saving mode, without requiring the user's additional operation. Additionally, the present invention provides a mobile device adapted to the method.

In accordance with an aspect of the present invention, a method for controlling a mobile device with a memo function is provided. The method includes executing a memo application in the background, and if a user's input for creating a memo is detected through a touch screen, creating a memo in the background through the memo application on the basis of the detected user's input.

In accordance with another aspect of the present invention, the touch screen is included in the mobile device or in a peripheral device connected to the mobile device.

In accordance with another aspect of the present invention, the creating of the memo includes receiving, from the peripheral device, information about the user's input detected through the touch screen of the peripheral device, and based on the received information, creating the memo.

In accordance with another aspect of the present invention, the executing of the memo application in the background includes displaying, on the touch screen, at least one of an idle screen, a lock screen, a power saving screen, and a privacy memo screen to avoid exposure of the user's input, wherein the user's input is detected through the at least one of the idle screen, the lock screen, the power saving screen, and the privacy memo screen.

In accordance with another aspect of the present invention, the privacy memo screen is formed of at least one color, one pattern, or one image, and is displayed on the entire touch screen or on a part of the touch screen.

In accordance with another aspect of the present invention, a trace of the user's input is not displayed on the touch screen.

In accordance with another aspect of the present invention, the creating of the memo includes when the user's input is detected, displaying a trace of the detected user's input on the touch screen, and removing the trace from the touch screen if a preset period of time has elapsed from the time point that the user's input is detected.

In accordance with another aspect of the present invention, the creating of the memo includes when the user's input is detected, defining a display area to be moved with a drag constituting the user's input, and displaying a part of a trace within the display area.

In accordance with another aspect of the present invention, the method further includes inserting a separation mark into the created memo if a new user's input is not detected for a preset period of time.

In accordance with another aspect of the present invention, the creating of the memo includes entering into a memo edit mode, selecting an edit target memo, and adding the user's input to the edit target memo.

In accordance with another aspect of the present invention, a mobile device with a memo function is provided. The mobile device includes a touch screen configured to detect a user's input and to display information, and a controller configured to execute a memo application in the background, and if the user's input for creating a memo is detected through the touch screen, to create a memo in the background through the memo application on the basis of the detected user's input.

In accordance with another aspect of the present invention, the mobile device further includes a connection unit configured to perform a data communication with a peripheral device, wherein the controller is further configured to receive, through the connection unit, information about the user's input detected through the touch screen of the peripheral device, and to create the memo on the basis of the received information.

In accordance with another aspect of the present invention, the controller is further configured to control the touch screen to display at least one of an idle screen, a lock screen, a power saving screen, and a privacy memo screen to avoid exposure of the user's input, and to detect the user's input through the at least one of the idle screen, the lock screen, the power saving screen, and the privacy memo screen.

In accordance with another aspect of the present invention, the privacy memo screen is formed of at least one color, one pattern, or one image, and is displayed on the entire touch screen or on a part of the touch screen.

In accordance with another aspect of the present invention, the controller is further configured to control the touch screen so as not to display a trace of the user's input.

In accordance with another aspect of the present invention, the controller is further configured to control the touch screen to display a trace of the detected user's input, and to remove the trace from the touch screen if a preset period of time has elapsed from the time point that the user's input is detected.

In accordance with another aspect of the present invention, the controller is further configured to, when the user's input is detected, define a display area to be moved with a drag constituting the user's input, and to control the touch screen to display a part of the trace within the display area.

In accordance with another aspect of the present invention, the controller is further configured to insert a separation mark into the created memo if a new user's input is not detected for a preset period of time.

In accordance with another aspect of the present invention, the controller is further configured to enter into a memo edit mode, to select an edit target memo, and to add the user's input to the edit target memo.

In accordance with another aspect of the present invention, at least one non-transitory processor readable medium for storing a computer program of instructions is provided. The at least one non-transitory processor readable medium for storing a computer program of instructions configured to be readable by at least one processor for instructing the at least one processor to execute a computer process for performing the methods claimed herein.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is to be understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention is related to mobile devices with a memo function, such as a memo writing function, a memo storing function, a memo editing function, a memo management, and the like.

In the following description, although embodiments of the invention are explained using a mobile device equipped with a memo function, it should be understood that the invention is not limited to the embodiments. Moreover, it is to be understood that the present invention can be applied to all information communication devices, multimedia devices, and their applications, when they are equipped with a memo function. Examples of such devices include smart phones, portable terminals, mobile communication terminals, Personal Digital Assistants (PDAs), Portable Multimedia Players (PMPs), laptop computers, Wibro terminals, start TVs, smart refrigerators, and the like.

The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

As used herein, the singular forms "a," "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention are described with reference to the accompanying drawings.

Figure 1:
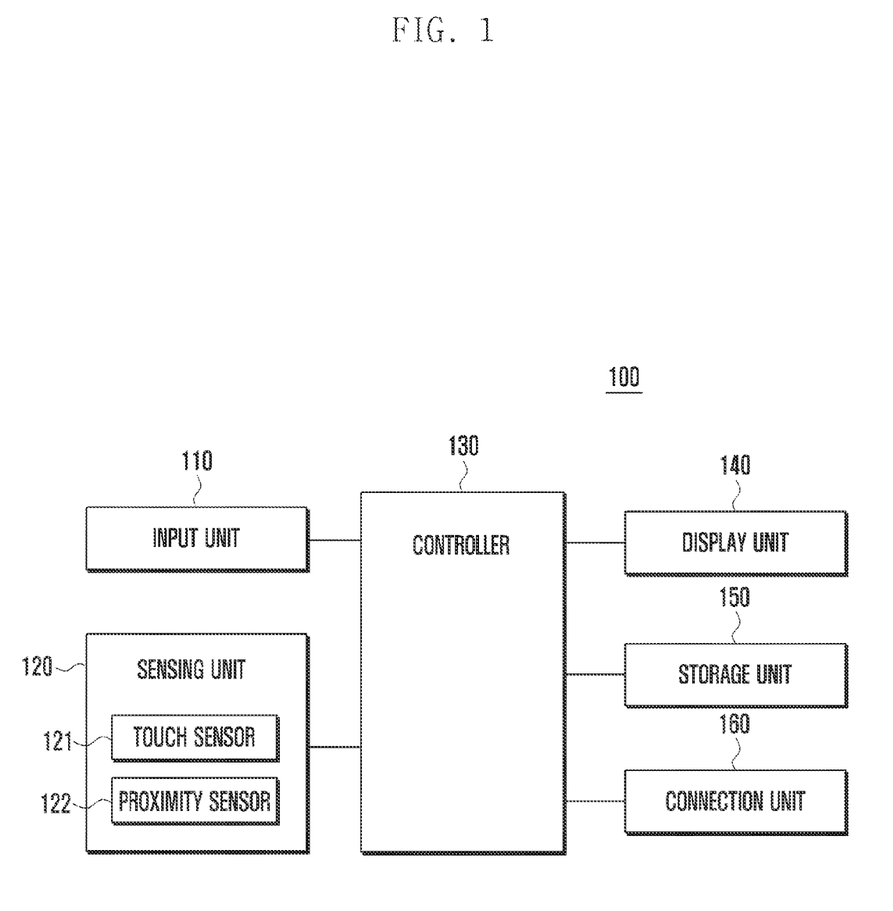
FIG. 1 is a block diagram illustrating a mobile device according to an exemplary embodiment of the present invention.

FIG. 1 illustrates a schematic block diagram of a mobile device apparatus according to an exemplary embodiment of the present invention.

Referring to FIG. 1, the mobile device 100 includes an input unit 110, a sensing unit 120, a controller 130, a display unit 140, a storage unit 150, and a connection unit 160.

The input unit 110 receives a user's input data for controlling the mobile device 100. The input unit 110 may be implemented with a keypad dome switch, a touch pad (pressure sensing or capacitive sensing), a jog wheel, a jog switch, or the like.

The sensing unit 120 includes, for example, a touch sensor 121 and a proximity sensor 122.

The touch sensor 121 senses the presence of touches. The touch sensor 121 may include a touch film, a touch sheet, or a touch pad. The touching operations are performed by touch means, e.g., the user's finger, a stylus pen, or the like. The touch sensor 121 may be combined with the display unit 140, thereby forming a touch screen. The touch sensor 121 may sense, for example, the change in the pressure or capacitance at a location on the display unit 140 to which a touch is applied and convert it to an electrical signal. The touch sensor 121 may detect the location of a touch, the area of a touch, and the pressure when a touch is applied to the display unit 140. The touch sensor 121 may sense the presence of a touch, create a corresponding signal, and transfer the signal to the controller 130. The controller 130 may detect the location of the touch on the display unit 140, according to the touch signal.

The proximity sensor 122 may be placed close to the display unit 140 or installed inside the mobile device 100. The proximity sensor 122 may detect the presence of nearby objects without any physical contact, via electromagnetic fields or infrared rays. The proximity sensor 122 may be implemented with various types of sensors, for example, a transmission photoelectric type, a direct reflective photoelectric type, a mirror photoelectric type, a high frequency oscillation type, a capacitance sensor, a magnetic type, an infrared type, or the like. If the display unit 140 is implemented with a capacitive touch screen, the proximity sensor 122 may sense the presence of a nearby pointer by detecting the change in an electric field according to the approach of the pointer.

The proximity sensor 122 senses the proximity of a touch and various types of touch patterns (e.g., a proximity touch distance, a proximity direction, a proximity touch velocity, a proximity touch time, a proximity touch location, a proximity touch moving state, or the like).

The controller 130 controls the entire operation of the mobile device 100. For example, the controller 130 may control the components in the mobile device 100 to execute a memo function. The controller 130 may execute a memo application on the background.

A description of the controller 130 is found below, including reference to the accompanying drawings.

The display unit 140 displays data processed in the mobile device 100 via, for example, a User Interface (UI) or a Graphic User Interface (GUI). The display unit 140 may be implemented with a flat display panel, such as a Liquid Crystal Display (LCD), a Thin Film Transistor-liquid crystal display (TFT), an Organic Light Emitting Diode (OLED), a flexible display, a three-dimensional (3D) display, or the like. The display unit 140 may be combined with the touch sensor 121 and/or the proximity sensor 122, thereby forming a touch screen. In that case, the display unit 140 may also serve as an input device. Exemplary embodiments disclosed hereinafter will be based on, but not limited to, the assumption that the display unit 140 is in the form of a touch screen.

The storage unit 150 stores control programs of the controller 130. The storage unit 150 may also store memos, phonebooks, messages, still images, videos, or the like. The storage unit 150 may also serve as a buffer.

The storage unit 150 may be a flash memory type, hard disk type, multimedia card micro type, card type of memory (e.g., SD, XD, etc.), Random Access Memory (RAM), Static Random Access Memory (SRAM), Read-Only Memory (ROM), Electrically Erase Programmable Read-Only Memory (EEPROM), Programmable Read-Only Memory (PROM), magnetic memory, magnetic disk, optical disk, or the like.

The connection unit 160 is configured to connect with peripheral devices optionally added to or associated with the mobile device 100. For example, the connection unit 160 may be connected with a case of the mobile device 100, an external screen, a smart TV, a PC, a tapbook, and the like. In some exemplary embodiments, such a peripheral device may have at least one touch screen.

Additionally, the connection unit 160 may perform a data communication with peripheral devices. In this case, the connection unit 160 may receive data associated with an input on the touch screen of peripheral devices and then deliver it to the control unit 130, or transmit a control signal of the control unit 130 to peripheral devices.

Figure 2:
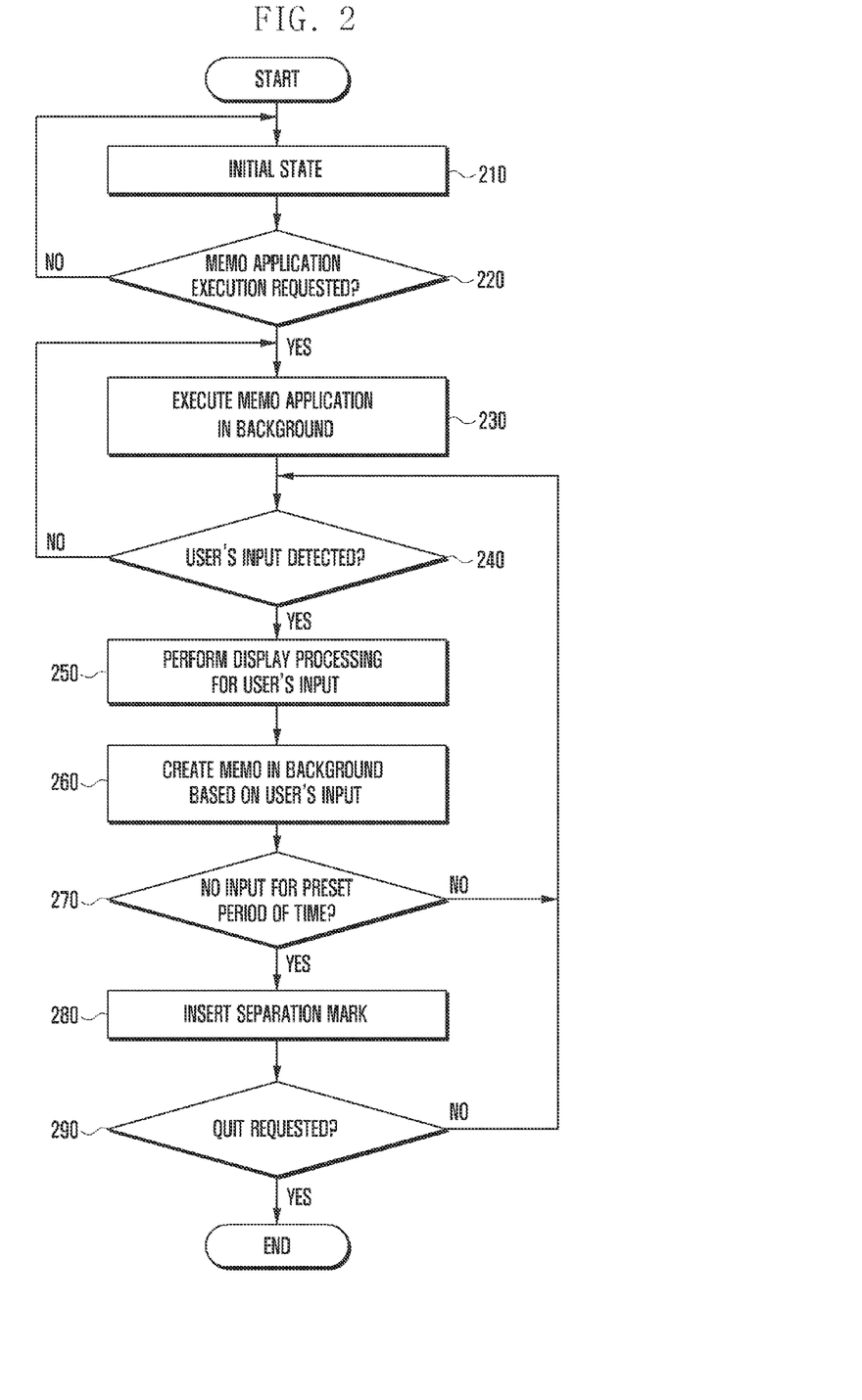
FIG. 2 is a flow diagram illustrating a method for controlling a mobile device according to an exemplary embodiment of the present invention.

FIG. 2 is a flow diagram illustrating a method for controlling a mobile device according to an exemplary embodiment of the present invention. Although described hereinafter as an exemplary embodiment in which a memo is inputted through a touch screen of the mobile device 100, or inputted through a touch screen of a peripheral device, this description is exemplary only, and is not to be construed as a limitation of the present invention.

Referring to FIG. 2, the controller 130 operates in an initial state at step 210.

In the initial state, the controller 130 may operate in a power saving mode, in a lock mode or in an idle mode, or may execute any application, any program or any service.

Depending on an operating state, the controller 130 may control a touch screen of the mobile device 100 to display a lock screen or to display an initial screen (including a background screen). Alternatively, the controller 130 may send a control signal to a peripheral device through the connection unit 160 such that a touch screen of the peripheral device displays a lock screen or an initial screen. In a case of operating in a power saving mode, the controller 130 may control the touch screen of the device 100 or may control the peripheral device in a turned-off state.

At step 220, the controller 130 determines whether a memo application execution request is detected.

More particularly, the controller 130 may determine whether user's request for executing a memo application is received or whether a request of other application, program or service associated with the memo application is received. Here, a user's request may be created through an input of a menu, an icon, a command, a shortcut key, a shortcut button, or the like, which may correspond to a request for executing the memo application, and may be provided in the mobile device 100 or the peripheral device.

If no request for executing the memo application is detected, the controller 130 returns to an initial state.

If a request for executing the memo application is detected, the controller 130 executes the memo application in the background at step 230.

The memo application is a specific application that provides a memo function such as a memo writing function, a memo editing function, a memo management function, a memo deletion function, and the like. The memo application may be installed at manufacture of the mobile device 100 or downloaded from a server.

In an exemplary embodiment, the controller 130 may execute a memo application in the background. Specifically, when the memo application is set up in a privacy memo mode, or when a memo application execution request corresponds to a privacy memo request, the controller 130 may execute the memo application in the background. Additionally, when a user selects or requests a privacy memo mode after the memo application is executed in the foreground, the controller 130 may convert a state of the memo application from the foreground to the background.

When the memo application is executed in the background, a memo application screen and a related UI or GUI are not displayed on the touch screen.

The controller 130 may control the touch screen of the mobile device 100 or the peripheral device such that a lock screen or an initial screen (including a background screen) may be displayed instead of the memo application screen. At this time, the controller 130 may display, on the lock screen or the initial screen, an icon, an image or any other graphical element for indicating that the memo application is being executed in the background or indicating an operating state (e.g., a standby state, a writing state, a saving state, a data processing state, etc.) of the memo application executed in the background.

The controller 130 may control the touch screen in a turned-off state.

In an exemplary embodiment, after executing the memo application, the controller 130 may control the touch screen to display a privacy memo screen. This privacy memo screen refers, for example, to a screen displayed to avoid exposure of a user's current memo input.

The privacy memo screen may be of any color, pattern, image, or the like. Based on a user's input or on a default value, the controller 130 may set such color, pattern or image as attributes of the privacy memo screen. In exemplary embodiments, the privacy memo screen may be displayed on the entire touch screen or on a part of the touch screen. For example, based on a user's input or a default value, the controller 130 may set the privacy memo screen to be black in color and having no pattern and display it on the entire area of the touch screen.

In response to a user's request or to a request of any application for providing a memo function, the controller 130 may control the touch screen to display a screen for setting the attributes of the privacy memo screen. Here, a user's request may be created through an input of a menu, an icon, a command, a shortcut key, a shortcut button, or the like, which corresponds to a request for displaying the privacy memo screen.

The memo application executed in the background may operate in a new memo mode or in a memo edit mode. If the memo application operates in a memo edit mode, the memo to be edited may be the most recently created memo, any privacy memo, any memo selected by user's setting, or the like.

At step 240, the controller 130 determines whether a user's input is detected.

More particularly, the controller 130 determines whether a user's input is detected though the touch screen of the mobile device 100 or of the peripheral device. Here, a user's input for creating a memo may be formed of at least one touch-and-drag gesture made by a certain object, such as a part of the user's body or a stylus pen. A touch-and-drag may include at least one of a letter, a number, a symbol, a picture, and the like.

If no user's input is detected, the controller 130 may return to a previous step of executing the memo application.

If a user's input is detected, the controller 130 performs a display processing for the detected user's input at step 250.

The controller 130 may analyze the detected user's input. Also, based on analysis results, the controller 130 may collect information about a detected time of a user's input, a detected location of a touch-and-drag input, a speed and pressure of a drag input, and the like.

Additionally, the controller 130 performs a display processing for a trace of the touch-and-drag.

In an exemplary embodiment, the trace of touch-and-drag may not be displayed on the touch screen.

In another exemplary embodiment, the controller 130 may control the touch screen to display the trace of touch-and-drag.

Figure 3:
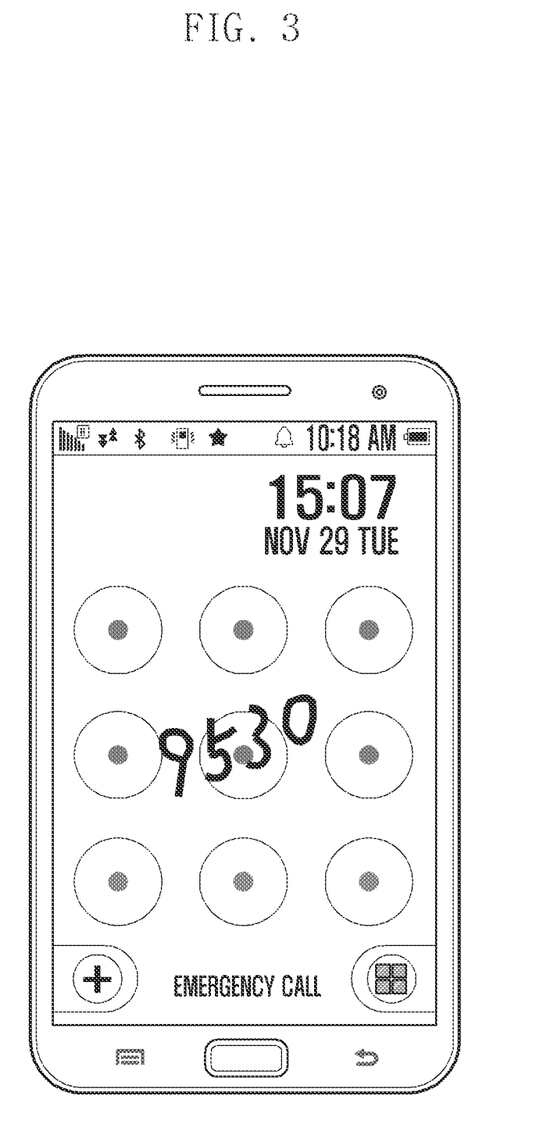
FIG. 3 illustrates a screen showing display processing results according to an exemplary embodiment of the present invention.

FIG. 3 illustrates a screen showing display processing results according to an exemplary embodiment of the present invention.

Referring to FIG. 3, when an idle screen, a lock screen or a privacy memo screen is displayed on the touch screen, the controller 130 may control the touch screen to display the trace of touch-and-drag on such an idle screen, a lock screen or a privacy screen as shown in FIG. 3.

Figure 4:
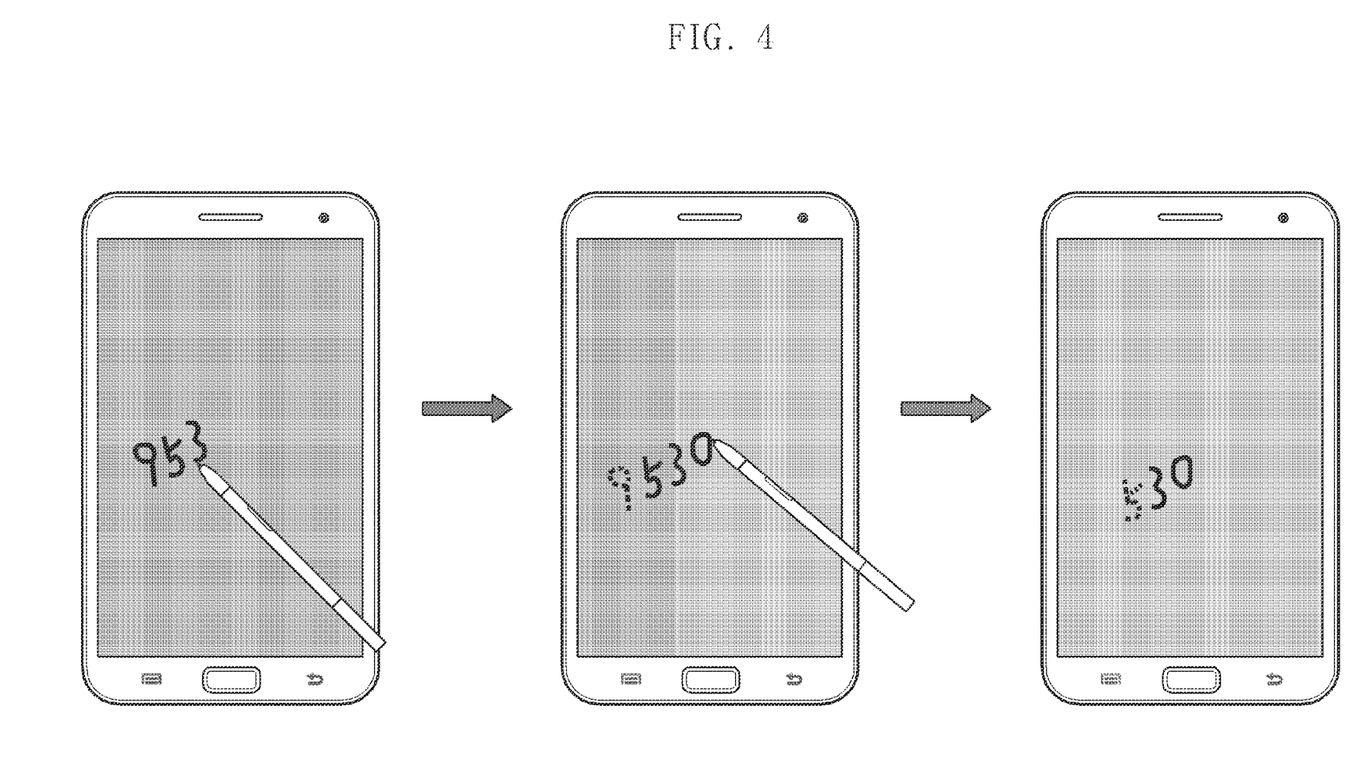
FIG. 4 illustrates screens showing display processing results according to another exemplary embodiment of the present invention.

After a preset period of time has elapsed from the time point that the touch-and-drag occurs, the controller 130 may control the touch screen to remove the displayed trace as shown in FIG. 4.

FIG. 4 illustrates screens showing display processing results according to another exemplary embodiment of the present invention.

Referring to FIG. 4, in a case of a user's input formed of plural touch-and-drags, the traces of such touch-and-drags may be sequentially removed from the touch screen. When removing the trace of the touch-and-drag, the controller 130 may control the touch screen to give an effect such as an action effect, a fading effect, a color change effect, or the like.

Therefore, the mobile device 100 of this invention not only provides convenience, such that a user can input a memo (i.e. a short note) while watching the input of the memo, but can also enhance privacy by removing the inputted memo after a preset period of time so as not to expose the inputted memo to other people.

Figure 5:
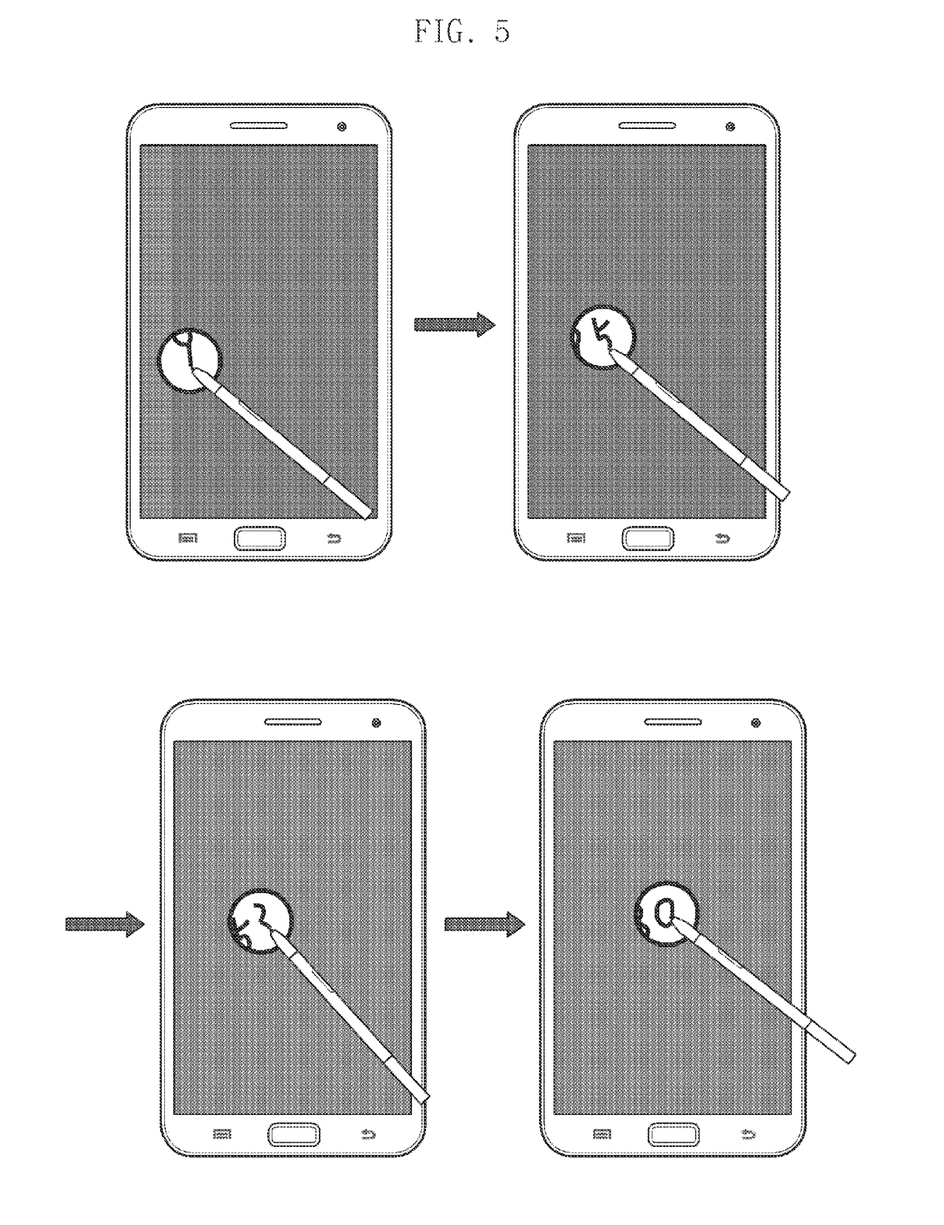
FIG. 5 illustrates screens showing display processing results according to still another exemplary embodiment of the present invention.

In still another exemplary embodiment, the controller 130 may control the touch screen to display the trace only within a display area that moves with a drag.

FIG. 5 illustrates screens showing display processing results according to still another exemplary embodiment of the present invention.

Referring to FIG. 5, the controller 130 may define a display area to be moved with a drag, and may control the touch screen to display the trace of touch-and-drag just within the display area. In this case, the controller 130 may control the touch screen to display a memo background screen within the display area and to display the trace of touch-and-drag on the memo background screen.

The display area may be formed of any color, pattern, image, or the like, which is distinguished from a current display screen, such as an idle screen, a lock screen or a privacy memo screen. Also, the display area may have various shapes with various sizes such as a circle, an ellipse, a triangle, a quadrangle, a lozenge, a trapezoid, or the like.

At step 260, the controller 130 may create a memo in the background based on a user's input.

Figure 6:
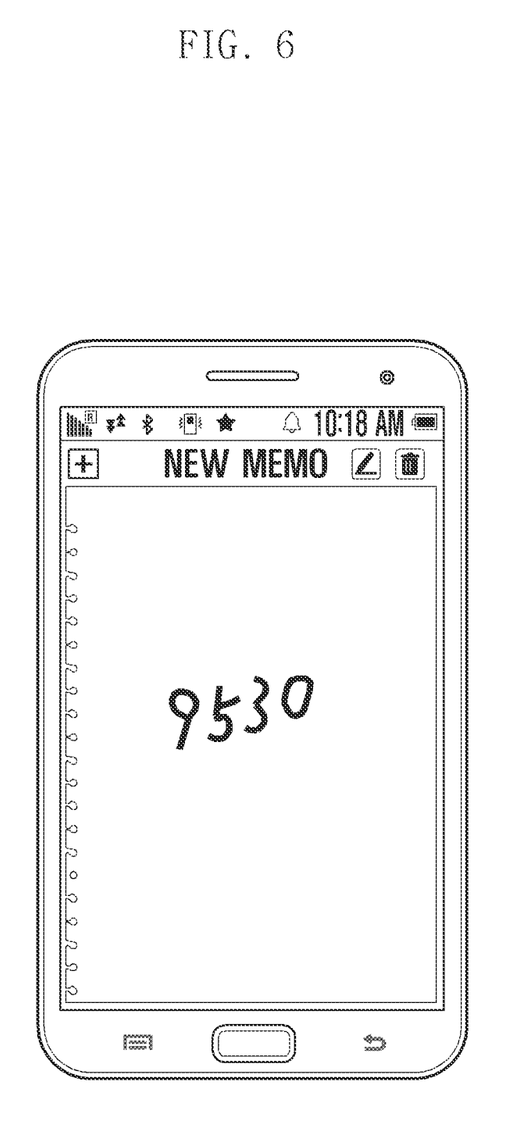
FIG. 6 illustrates a screen showing a short note according to an exemplary embodiment of the present invention.

Specifically, the controller 130 receives a user's input as an input of the memo application executed in the background, and then creates a memo in the background. As shown in FIG. 6, the created memo may have the same form as when the memo application is executed in the foreground.

The controller 130 may create a new memo from a user's memo input. Namely, when the memo application executed in the background operates in a new memo mode, the controller 130 may create a new memo by adopting a user's input as a memo.

The controller 130 may add a user's input to a previously created memo. Namely, when the memo application executed in the background operates in a memo edit mode, the controller 130 may add a user's input to a previous memo to be edited.

The controller 130 may also create a memo by using the trace itself of a user's input. Alternatively, the controller 130 may create a memo by extracting recognizable text from a user's input. As yet another alternative, the controller 130 may create a memo by capturing an image of a region containing a user's input and then by attaching the image to a memo.

The controller 130 may create a memo on the memo background screen. Specifically, as shown in FIG. 6, the controller 130 may create a memo by combining a user's input with the memo background screen provided by the memo application.

FIG. 6 illustrates a screen showing a short note according to an exemplary embodiment of the present invention.

Referring to FIG. 6, the controller 130 may produce respectively different layers of memo background screen and of user's input and then combine such layers to create a memo.

The memo background screen is different from the privacy memo screen and may be formed of any color, any pattern, any image, or the like. For example, the memo background screen may be formed of an image such as a memo pad, a sketchbook, a diary, a scheduler, a note, or the like. Alternatively, the memo background screen may be formed of at least one of a memo region and a UI display region for a memo application.

In an exemplary embodiment, the controller 130 may combine a user's memo input with the memo background screen by arranging it at a certain location thereon. The location may be the same as or different from a location of the user input detected through the touch screen. For example, when a new memo is created, the controller 130 may combine the input memo with the memo background screen by arranging it on an upper location thereof. Alternatively, when any existing memo is edited, the controller 130 may combine the input memo with the memo background screen by arranging it in a blank area thereof.

If necessary, the controller 130 may combine a memo input time, a memo input location, memo writer information, or the like, with a memo.

The controller 130 may control the storage unit 150 to permanently or temporarily store the created memo. Also, the controller 130 may control the touch screen to display the created memo according to a user's request.

At step 270, the controller 130 may determine whether a user's input is not detected for a preset period of time.

The preset period of time is used to check user's intention to write a memo. If a user's input is not detected for a preset period of time, the controller 130 may determine that a user stops or quits writing a memo. The preset period of time may be set in advance according to a user's selection or a default value.

After a preset period of time has elapsed, the controller 130 may insert a separation mark into a memo at step 280.

In exemplary embodiments, in order to indicate that a period of time has elapsed, the controller 130 may insert a separation mark (e.g., a separation line, a timeline, etc.) into the created memo.

Also, the controller 130 may scroll the created memo in a certain direction (which is called 'a line feed,' 'a line break,' etc.). For example, the controller 130 may scroll up the created memo.

When a number of memos are inputted in order after a preset period of time has elapsed, the controller 130 may sequentially combine the memos from the top to the bottom. In addition, the controller 130 may also insert a separation mark between the memos sequentially combined with each other to indicate that there is a time interval therebetween.

Finally, at step 290, the controller 130 may determine whether a quit command is detected.

Specifically, the controller 130 may determine whether a quit command of memo writing is detected according to a user's input or according to a request of an application. The quit command may occur through a button or through the touch screen of the mobile device 100 or the peripheral device.

If the quit command is detected, the controller 130 may quit a control process of the mobile device 100.

If the quit command is not detected, the controller 130 may return to the previous step 240 so as to repeatedly perform a memo writing.

Figure 7:
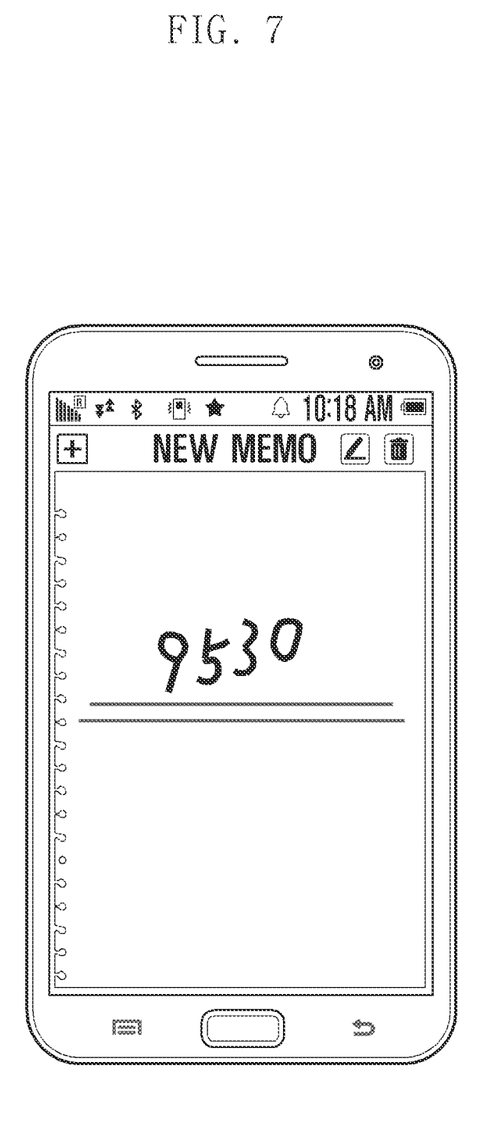
FIG. 7 illustrates a screen showing a short note with a separation mark according to an exemplary embodiment of the present invention.

FIG. 7 illustrates a screen showing a short note with a separation mark according to an exemplary embodiment of the present invention.

Referring to FIG. 7, if there is no quit command for a given time after the memo is created, the controller 130 returns to the previous step of detecting a user's memo input. If a new user's memo input is detected through the touch screen, the controller 130 adds the new input at a lower part of the previous memo as shown in FIG. 8.

Figure 8:
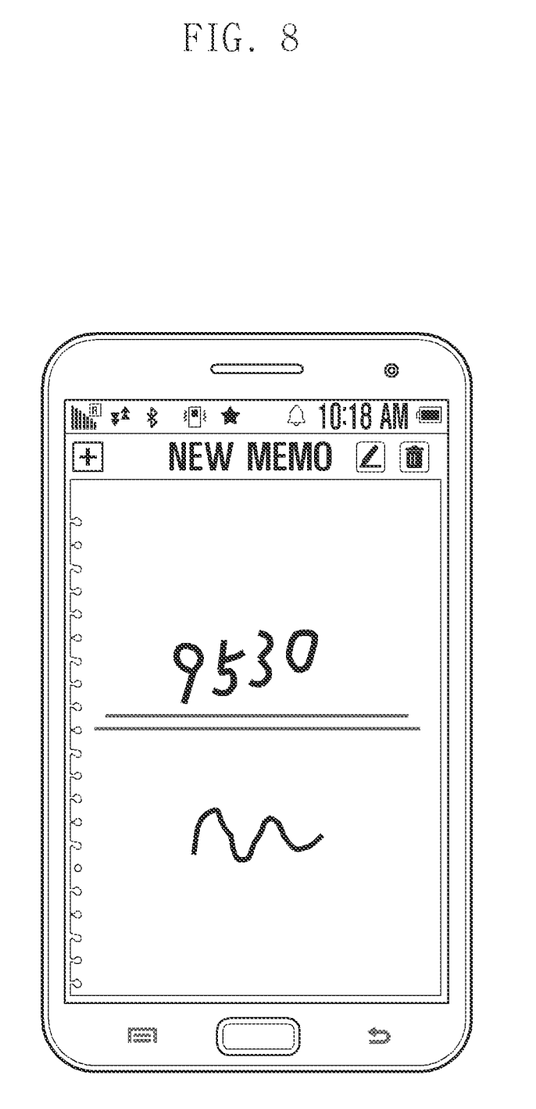
FIG. 8 illustrates a screen showing a short note created by a method for controlling the device according to an exemplary embodiment of the present invention.

FIG. 8 illustrates a screen showing a short note created by a method for controlling the device according to an exemplary embodiment of the present invention.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a mobile device with a memo function, the method comprising:
    executing a memo application in a background;
    if a handwriting input for creating a memo is detected through a first screen displayed on a touch screen, extracting at least one text from the handwriting input and displaying a trace of the handwriting input on the first screen displayed on the touch screen;
    in response to detecting the handwriting input, sequentially removing the trace of the handwriting input from the first screen if a preset period of time has elapsed from the time point that the handwriting input is detected; and
    creating a memo in the background through the memo application on the basis of the detected handwriting input,
    wherein the creating of the memo comprises combining the at least one text extracted from the handwriting input detected through the first screen with a second screen provided by the memo application.

2. The method of claim 1, wherein the touch screen is included in the mobile device or in a peripheral device connected to the mobile device.

3. The method of claim 2, wherein the creating of the memo includes:
    receiving, from the peripheral device, information about the handwriting input detected through the touch screen of the peripheral device; and
    based on the received information, creating the memo.

4. The method of claim 1,
    wherein the first screen comprises at least one of an idle screen, a lock screen, a power saving screen, and a privacy memo screen to avoid exposure of the handwriting input, and
    wherein the handwriting input is detected through the at least one of the idle screen, the lock screen, the power saving screen, and the privacy memo screen.

5. The method of claim 4, wherein the privacy memo screen is formed of at least one color, one pattern, or one image, and is displayed on the entire touch screen or on a part of the touch screen.

6. The method of claim 1, wherein the trace of the handwriting input is not displayed on the touch screen.

7. The method of claim 1, wherein the creating of the memo includes:
    when the handwriting input is detected, defining a display area to be moved with a drag constituting the handwriting input; and
    displaying a part of a trace within the display area.

8. The method of claim 1, further comprising:
    inserting a separation mark into the created memo if a new handwriting input is not detected for a preset period of time.

9. The method of claim 1, wherein the creating of the memo includes:
    entering into a memo edit mode;
    selecting an edit target memo; and
    adding the handwriting input to the edit target memo.

10. At least one non-transitory processor readable medium for storing a computer program of instructions configured to be readable by at least one processor for instructing the at least one processor to execute a computer process for performing the method as recited in claim 1.

11. A mobile device with a memo function, the mobile device comprising:
    a touch screen configured to:
        display a first screen, and
        detect a handwriting input through the first screen; and
    a processor configured to:
        execute a memo application in a background,
        if the handwriting input for creating a memo is detected through the touch screen, extract at least one text from the handwriting input and control the touch screen to display a trace of the handwriting input on the first screen,
        in response to detecting the handwriting input, sequentially remove the trace of the handwriting input from the first screen if a preset period of time has elapsed from a time point that the handwriting input is detected,
        create a memo in the background through the memo application on the basis of the detected handwriting input, and
        combine the at least one text extracted from the handwriting input detected through the first screen with a second screen provided by the memo application.

12. The mobile device of claim 11, further comprising:
    a communication module configured to communicate with a peripheral device through wireless or wired communication,
    wherein the processor is further configured to receive, through the communication module, information about the handwriting input detected through the touch screen of the peripheral device, and to create the memo on the basis of the received information.

13. The mobile device of claim 11, wherein the first screen comprises at least one of an idle screen, a lock screen, a power saving screen, and a privacy memo screen to avoid exposure of the handwriting input, and the processor is further configured to detect the handwriting input through the at least one of the idle screen, the lock screen, the power saving screen, and the privacy memo screen.

14. The mobile device of claim 13, wherein the privacy memo screen is formed of at least one color, one pattern, or one image, and is displayed on the entire touch screen or on a part of the touch screen.

15. The mobile device of claim 11, wherein the processor is further configured to control the touch screen so as not to display the trace of the handwriting input.

16. The mobile device of claim 11, wherein the processor is further configured to, when the handwriting input is detected, define a display area to be moved with a drag constituting the handwriting input, and to control the touch screen to display a part of a trace within the display area.

17. The mobile device of claim 11, wherein the processor is further configured to insert a separation mark into the created memo if a new handwriting input is not detected for a preset period of time.

18. The mobile device of claim 11, wherein the processor is further configured to enter into a memo edit mode, to select an edit target memo, and to add the handwriting input to the edit target memo.

* * * * *